F. C. HALLER.
OVEN WALL CONSTRUCTION.
APPLICATION FILED AUG. 18, 1920.

1,378,346.

Patented May 17, 1921.

WITNESSES
J. Herbert Bradley.
J. M. Geoghegan.

INVENTOR
FREDERICK C. HALLER
by
Clarke & Doolittle
his attorneys

UNITED STATES PATENT OFFICE.

FREDERICK C. HALLER, OF PITTSBURGH, PENNSYLVANIA.

OVEN-WALL CONSTRUCTION.

1,378,346.  Specification of Letters Patent.  Patented May 17, 1921.

Application filed August 18, 1920. Serial No. 404,437.

*To all whom it may concern:*

Be it known that I, FREDERICK C. HALLER, a citizen of the United States, and resident of Pittsburgh, in the county of Allegheny and State of Pennsylvania, have invented a new and useful Improvement in Oven-Wall Construction; and I do hereby declare the following to be a full, clear, and exact description thereof.

This invention relates to improvements in oven wall construction, and particularly to the construction of walls of bread baking ovens of the continuous carrier type, such as that shown in my pending application Serial Number 387,973, filed June 10, 1920.

In bread baking ovens as heretofore used, it has usually been the practice to construct the walls of brick and to make them relatively thick. Such an oven is disadvantageous in that it must be placed on a special foundation in the building in which it is housed. The second disadvantage resides in the fact that a large amount of heat from the fuel is absorbed by the bricks making the oven more expensive to operate, in that a great percentage of the heat does not go into the baking of the bread. Still another disadvantage exists in these ovens because of the absorption of heat they cannot be readily cooled for the purpose of making repairs, it often taking several days for such an oven to cool, and after being cooled they cannot again be quickly heated. Attempts have been made to provide other walls formed of metal plate, between which a heat insulating material is placed; but owing to variations in the temperatures to which they are subjected the sheets of metal buckle, warp and break down the heat insulating wall. Furthermore, such ovens waste much of the heat in the oven chamber by reason of conduction and radiation.

According to the present invention, the walls are so constructed as to be of minimum weight, permitting the oven to be placed anywhere in a building without reference to special foundations, and such walls, while strong and durable, will absorb, radiate, and conduct a minimum amount of heat from the oven chamber.

My invention is illustrated in the accompanying drawings, in which—

Figure 1:
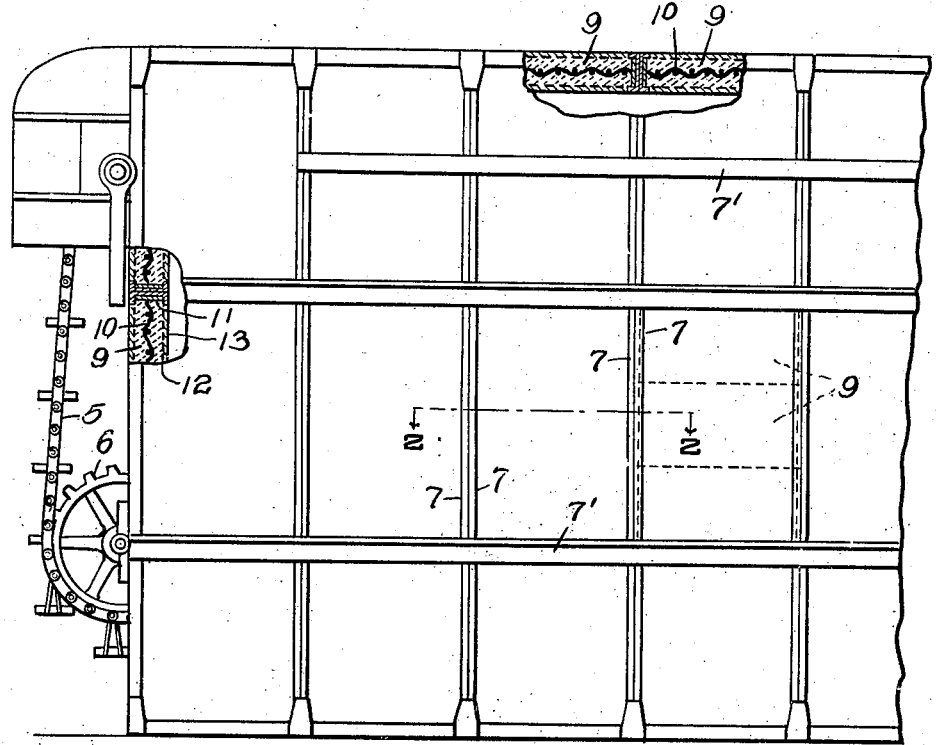
Figure 2:
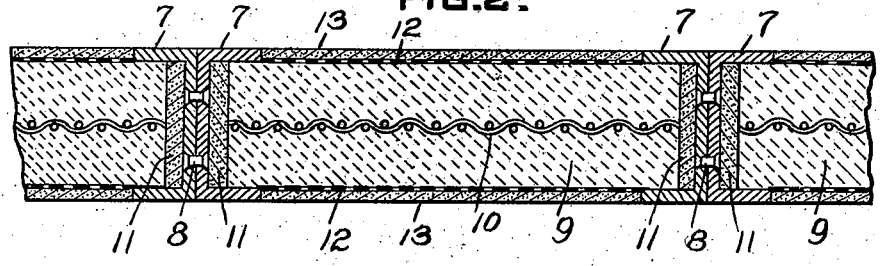

Figure 1 is a side elevation of a portion of a continuous carrier oven having the walls thereof formed in accordance with my invention. Fig. 2 is an enlarged section on line 2—2 of Fig. 1.

In the drawings, A represents the oven, which is preferably rectangular in shape. Supported at the front of the oven is a continuous carrier, indicated at 5 and supported on a sprocket 6. This carrier passes through the oven in the manner disclosed in my prior pending application previously referred to. My present invention, however, is not limited to an oven having this or any other form of a continuous carrier.

The oven A is formed of a skeleton or frame of structural metal comprising adjacent channel irons 7 arranged in pairs, as shown in Fig. 2, and riveted or otherwise secured together at 8. These pairs of channel irons are spaced from each other, as shown. At 7' are suitable horizontal brace members.

Between the pairs of channel irons 7 are arranged blocks 9 of heat insulating material, preferably comprising magnesia brick having an embedded reinforcement comprising heavy wire net 10. The width of the blocks is indicated by the horizontal dotted lines of Fig. 1. These blocks, as shown in Fig. 2, are of slightly less length than the distance between the bottoms of the channels, but they are of sufficient width to be retained in position by the sides of the channels. The blocks are preferably made of less length than the distance between the bottoms of the channels so that they may be inserted in the frame of the oven after it has been assembled. In the spaces between the ends of the blocks and the bottoms of the channels is a packing 11 of asbestos cement which is filled in after the block has been placed in position.

After the blocks have been secured in position, sheets of expanded metal lath 12, or similar material, are placed against them, and a surfacing 13 of asbestos cement is applied so that the surface of the cement is even with the outside of the sides of the channel irons. If desired, this surfacing could be made thicker.

It has been found that an oven wall constructed in this manner is durable and highly efficient and will not break down under the different temperature conditions to which it is subjected. The smooth white interior of the oven provided by the asbestos cement forms a reflecting surface on the interior of the oven for the heat. The outside of the oven, after it has been used several hours, does not become uncomfortably hot to the touch even though the interior may be at a temperature between 400° and 500° F. Furthermore, the oven is not of such weight as to require a special foundation in the building where it is located. The walls do not absorb and retain the heat, so that the oven chamber may be quickly heated or cooled and the temperature can be readily and almost immediately controlled by thermostats.

I claim as my invention—

1. An oven having a frame of structural metal members, heat insulating material supported and retained in position by said structural metal members, expanded metal lath applied to each side of the heat insulating material, and a facing of heat insulating material over said lath, said facing forming the interior and exterior surfaces of the oven.

2. An oven having a frame of structural metal members, a reinforced heat insulating material supported by and retained in position by the structural metal members in said frame, and a surfacing of heat insulating material applied thereover, such surfacing forming the exterior and interior surfaces of the oven.

3. An oven having a frame of structural metal members, a wall of heat insulating material having embedded reinforcement therein and supported in position by said frame members, expanded metal lath applied to the surfaces of the wall, and a surfacing of heat insulating material over said lath, such facing forming the interior and exterior surfaces of the oven.

4. An oven having a frame constructed of structural metal, a wall supported by said structural metal frame and retained in position thereby, said wall comprising blocks of heat insulating material, a facing of heat insulating material over said blocks, and means between the facing and the blocks by which said facing is supported, said facing forming the interior and exterior surfaces of the oven.

5. An oven having a frame composed of pairs of oppositely faced channel irons secured together, said channel irons having bottom and side portions, said pairs of channel irons being spaced apart from each other, blocks of reinforced heat insulating material between said pairs of channel irons and held in place by them, and a surfacing of heat-insulating material at each side of the blocks.

6. An oven having a frame composed of oppositely faced channel irons secured together, said channel irons having bottom and side portions, said pairs of channel irons being spaced apart from each other, blocks of reinforced heat insulating material between said pairs of channel irons and held in place by them, expanded metal lath secured on the outsides of the blocks, and a facing of heat insulating material applied to the expanded metal lath.

7. An oven having a frame composed of pairs of oppositely faced channel irons secured together, said channel irons having bottom and side portions, said pairs being spaced apart from each other, blocks of reinforced heat insulating material between said pairs of channel irons and held in place by them, said blocks being of slightly less length than the distance between the bottoms of the channel irons, a heat insulating packing between the ends of the blocks and the bottoms of the channel irons, and a surfacing of heat insulating material at each side of the blocks.

In testimony whereof I, the said FREDERICK C. HALLER, have hereunto set my hand.

FREDERICK C. HALLER.

Witness:
J. M. GEOGHEGAN.